(12) United States Patent  
Jesse

(10) Patent No.: US 8,662,285 B2
(45) Date of Patent: Mar. 4, 2014

(54) SWING HOPPER FOR A GRAIN AUGER

(76) Inventor: Lynn Jesse, Urbandale, IA (US)

( * ) Notice: Subject to any disclaimer, the term of this patent is extended or adjusted under 35 U.S.C. 154(b) by 29 days.

(21) Appl. No.: 13/544,195

(22) Filed: Jul. 9, 2012

(65) Prior Publication Data

US 2014/0008182 A1  Jan. 9, 2014

(51) Int. Cl.
  *B65G 33/00* (2006.01)
  *B65G 47/20* (2006.01)
(52) U.S. Cl.
  USPC ........... 198/671; 198/300; 198/311; 198/317; 198/589; 198/666; 198/668
(58) Field of Classification Search
  USPC ................ 198/311, 314, 315, 317, 318, 300, 198/467.1, 527, 540, 542, 543, 545, 548, 198/584, 587, 589, 592, 657, 666, 668, 671
  See application file for complete search history.

(56) References Cited

U.S. PATENT DOCUMENTS

| 4,603,775 | A  | * | 8/1986  | Plett ............................. | 198/589 |
| 4,963,066 | A  | * | 10/1990 | Boppart ........................ | 414/376 |
| 5,234,094 | A  | * | 8/1993  | Weyermann et al. ......... | 198/303 |
| 5,305,866 | A  | * | 4/1994  | Stewart et al. ................ | 198/311 |
| 5,788,055 | A  | * | 8/1998  | Stewart et al. ................ | 198/671 |
| 7,191,889 | B1 | * | 3/2007  | Heley ............................ | 198/315 |
| 7,428,956 | B2 | * | 9/2008  | Scherman ..................... | 198/312 |
| 7,708,131 | B2 | * | 5/2010  | Muth ............................ | 198/315 |
| 7,946,416 | B2 | * | 5/2011  | Grose et al. ................... | 198/671 |
| 8,118,151 | B1 | * | 2/2012  | Jesse ............................. | 198/315 |
| 8,272,494 | B2 | * | 9/2012  | Zazula et al. ................. | 198/313 |
| 8,381,900 | B1 | * | 2/2013  | Hoogestraat ................. | 198/588 |

* cited by examiner

*Primary Examiner* — Leslie A Nicholson, III
(74) *Attorney, Agent, or Firm* — Dennis L. Thomte; Thomte Patent Law Office LLC

(57) ABSTRACT

A swing hopper is pivotally secured about vertical and horizontal axes to the inlet end of a swing auger which is pivotally connected to the main auger tube of a grain auger.

2 Claims, 4 Drawing Sheets

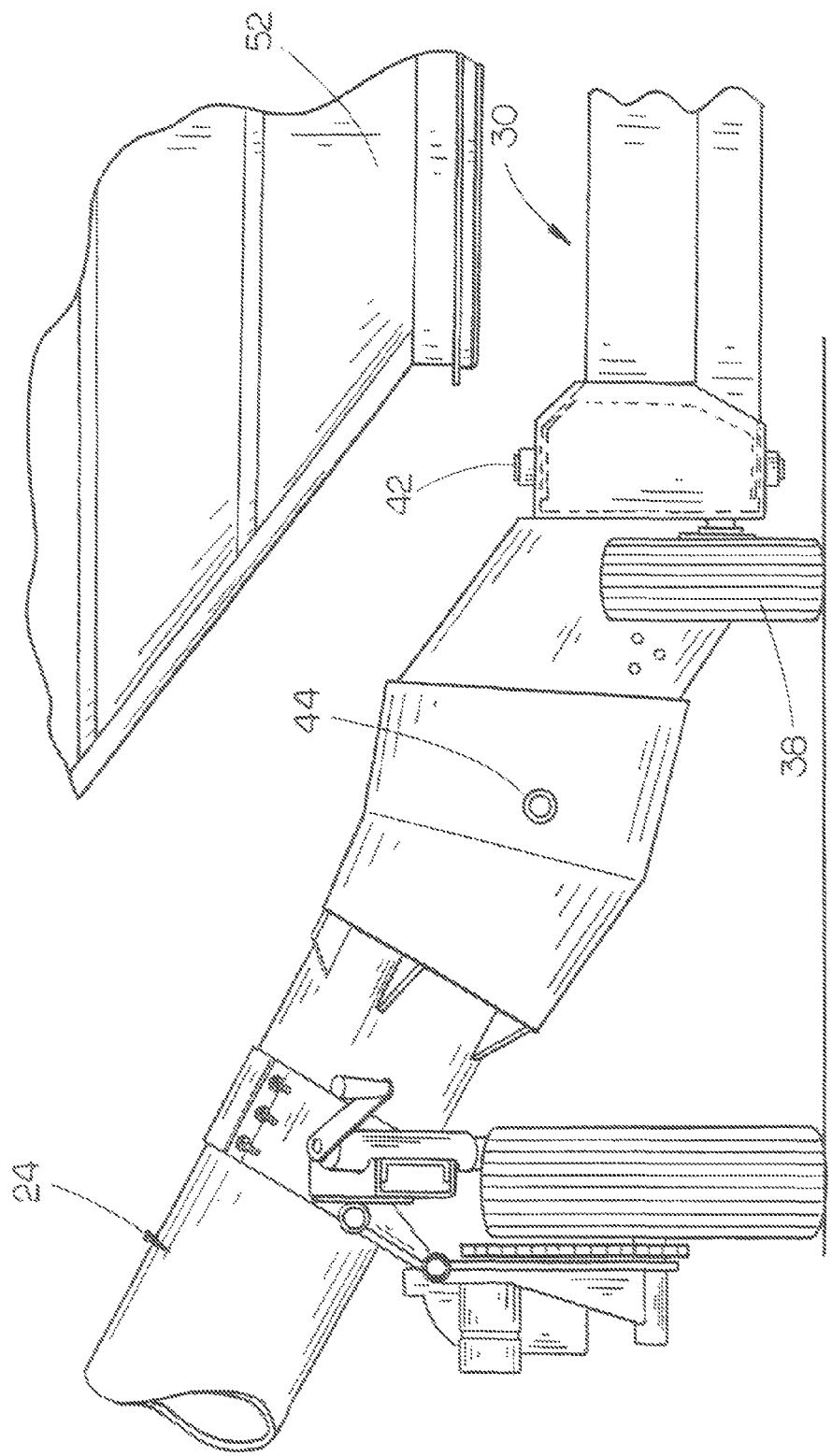

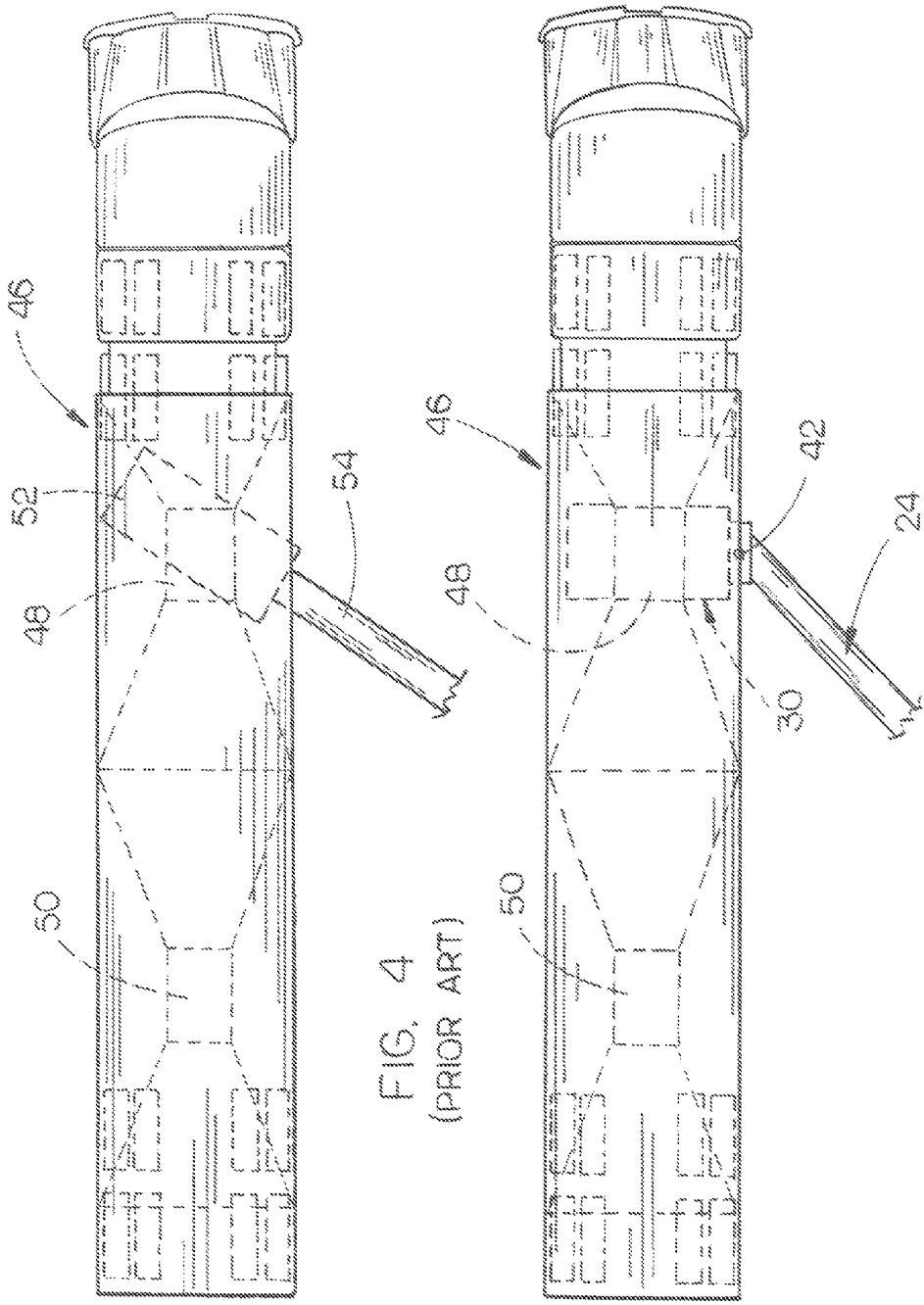

SWING HOPPER FOR A GRAIN AUGER

BACKGROUND OF THE INVENTION

1. Field of the Invention

This invention relates to a swing hopper for a grain auger with the swing hopper being attached to the lower end of a swing auger tube, which is pivotally secured to the main auger tube of the grain auger, about horizontal and vertical axes.

2. Description of the Related Art

Grain augers are frequently used to transfer grain or other particulate material from a truck or a trailer to a grain storage unit. Many of the trailers being used to transport grain to the grain storage units are of the "hopper bottom" type wherein a pair of longitudinal spaced-apart grain hoppers with trap doors at the lower ends thereof are located at the underside of the trailer body for discharging grain therefrom. In most cases, a swing hopper is movably positioned below the trap door of the hopper for receiving the grain being discharged from the hopper after the trap door has been opened. After one hopper has been emptied, the swing hopper is moved to positions below the other hopper. The inner end of the swing hopper is pivotally connected to the lower end of a swing hopper auger about a horizontal axis so that the swing hopper may pivot up and down with respect to the swing hopper auger to compensate for ground irregularities. The discharge end of the swing hopper auger tubes are normally pivotally connected to the main auger above the lower end thereof.

The weight and length of trailers has recently increased with 50-foot trailers being legal and with the grain hoppers or dumps on the trailer being farther apart than normal. In most cases, the swing hopper cannot reach both hoppers without moving the trailer. Many attempts have been provided in an effort to solve the problem of being able to sufficiently swing the hopper in a manner so that the swing hopper may be positioned below either of the grain hoppers without moving the trailer. See for example, U.S. Pat. Nos. 7,946,416 and 7,428,956. In U.S. Pat. No. 7,946,416 the length of the swing auger tube has been extended so as to reach both grain hoppers but the square hopper on the swing hopper of the '416 patent is not parallel with the square hole of the trailer hopper resulting in grain spilling onto the ground and with the swing hopper interfering with either the grain trailer wheels or the jacks of the trailer and not being able to center under the trailer grain hopper. In U.S. Pat. No. 7,428,956, an attempt is made to align the swing hopper to the grain hopper but contains a large number of moving parts and is therefore rather expensive.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A grain auger assembly is provided which includes an elongated main auger having a main auger tube with a lower intake end and an upper discharge end. The main auger is capable of conveying grain upwardly therethrough to the upward discharge end thereof. An elongated swing auger is provided including a swing auger tube having an inlet end and an outlet end. The swing auger is capable of conveying grain from the inlet end thereof to the outlet end thereof. The swing auger tube is pivotally connected to the main auger tube above the lower end thereof such that grain being discharged from the outlet end of the swing auger tube is discharged into the main auger tube.

A generally horizontally disposed swing hopper, having inner and outer ends, and an open top is provided for receiving grain therein. The swing hopper is capable of conveying grain received therein into the swing auger tube. The inner end of the swing hopper of this invention is pivotally secured to the swing auger tube about a vertical axis and a horizontal axis.

The pivotal connection of the inner end of the swing hopper to the swing auger tube about a vertical axis and a horizontal axis enables the swing hopper to be positioned beneath the grain hoppers of a trailer so as to be properly aligned therewith to prevent grain from spilling onto the ground.

It is therefore a principal object of the invention to provide an improved grain auger assembly.

A further object of the invention is to provide a grain auger assembly including a swing hopper which is pivotally connected to a swing hopper auger about a vertical axis and a horizontal axis.

A further object of the invention is to provide a novel means of connecting a swing hopper to a swing hopper auger tube so that the swing hopper may be operatively positioned beneath the grain hoppers of a trailer without moving the trailer.

A further object of the invention is to provide a grain auger assembly of the type described which does not interfere with the wheels or jacks of a trailer.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a partial side elevational view of the swing hopper positioned beneath a hopper of a hopper bottom trailer;

FIG. 4 is a top elevational view illustrating the misalignment of a prior art swing hopper and the hopper of a hopper bottom trailer; and FIG. 5 is a top elevational view illustrating the possible alignment of the swing hopper of this invention with a hopper of a hopper bottom trailer.

DESCRIPTION OF THE PREFERRED EMBODIMENT

Figure 1:
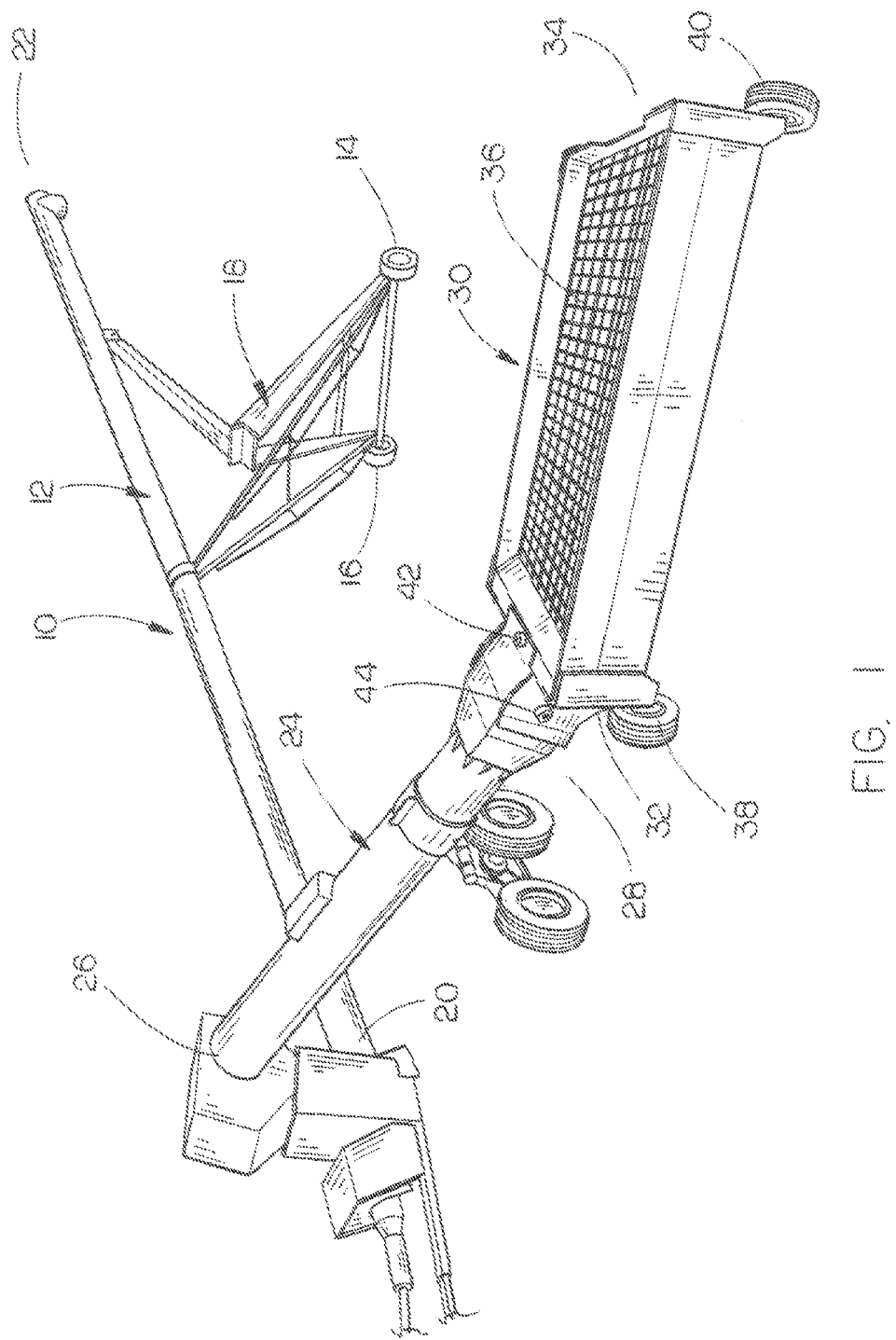
FIG. 1 is a perspective view of the swing hopper of this invention attached to a grain auger.
Figure 2:
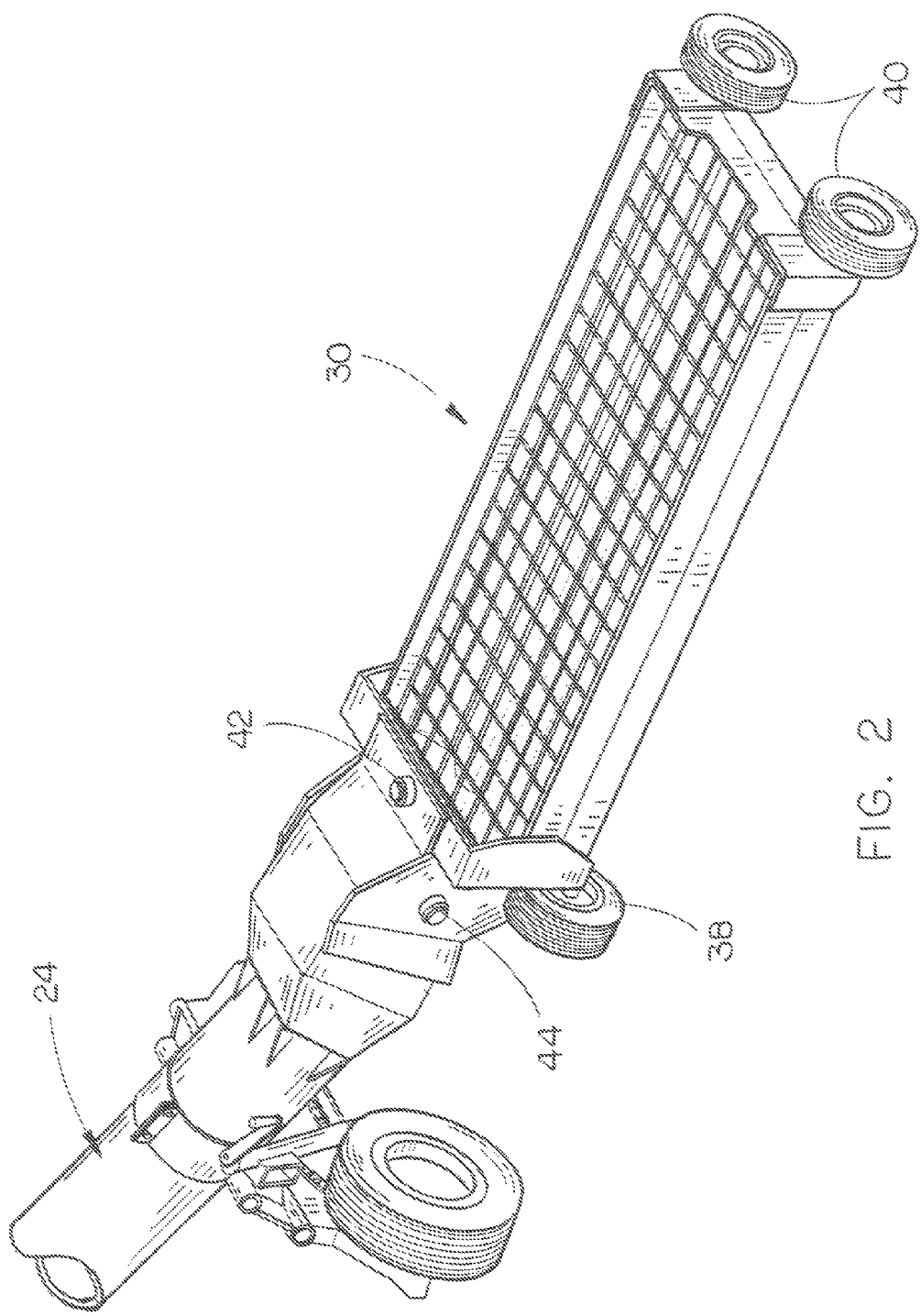
FIG. 2 is a perspective view of the swing hopper of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional grain auger having a main auger tube 12 supported on wheels 14 and 16. Wheels 14 and 16 are operatively connected to the main auger tube 12 by an adjustable framework 18 so that the upper end of the main auger tube 12 may be raised and lowered in conventional fashion. Main auger tube 12 has a lower end 20 and an upper discharge end 22. A conventional main auger is rotatably contained or positioned within the main auger tube 12 for conveying or auguring material such as grain therein from the lower end 20 to the upper discharge end 22 in conventional fashion.

The invention also includes a swing auger tube 24 having an upper discharge end 26 and a lower intake end 28. A swing auger of conventional design is rotatably contained or positioned within swing auger tub 24 for conveying material from the lower intake end 28 to the upper discharge end 26 and into the main auger tube 12 in conventional fashion.

The numeral 30 refers to a swing hopper having an inner end 32, an outer end 34 and an open upper end 36. Swing hopper 30 is supported by a pair of wheels 38 at its inner end and a pair of wheels 40 at its outer end. The inner end of swing hopper 30 is pivotally connected to the intake end 28 of swing hopper tube 24 by a vertical axis 42 and a horizontal axis 44. One or more conventional augers are positioned within hopper 30 for conveying grain therein to the inner end 32 thereof and into the intake end 28 of swing auger tube 24.

The numeral 46 refers to a conventional hopper bottom trailer having spaced-apart hoppers 48 and 50 positioned at the underside thereof. In FIG. 4, the numeral 52 refers to a conventional swing hopper. Inasmuch as the prior art swing hopper 52 is not pivotal to the swing auger tube about a vertical axis, the swing hopper 52 cannot be properly aligned with both hoppers without moving the trailer after one hopper has been emptied.

As seen in FIG. 5, the vertical axis 42 permits the swing hopper 30 to be properly aligned with both hoppers 50 and 52 without moving the trailer. The swing hopper 30 may be manually pivoted about vertical axis 42 or may have an actuator such as a power cylinder or the like attached thereto for pivoting the swing hopper. If an actuator is utilized, it may be remotely controlled. It can therefore be seen that the swing hopper of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A grain auger assembly, comprising:
   an elongated main auger including a main auger tube having a lower intake end and an upper discharge end;
   said main auger capable of conveying grain upwardly therethrough to said upper discharge end;
   an elongated swing auger including a swing auger tube having an inlet end and an outlet end;
   said swing auger capable of conveying grain from said inlet end thereof to said outlet end thereof;
   said outlet end of said swing auger tube being pivotally connected to said main auger tube at said lower end thereof such that grain being discharged from said outlet end of said swing auger tube is discharged into said main auger tube;
   a generally horizontally disposed swing hopper, having inner and outer ends, and an open top for receiving grain therein;
   said swing hopper capable of conveying grain received therein into said swing auger tube;
   said inner end of said swing hopper being operatively pivotally secured to said inlet end of said swing auger tube about a vertical axis and a horizontal axis.

2. The grain auger assembly of claim 1 wherein said swing hopper is wheel supported.

* * * * *